(12) United States Patent
Nakamura et al.

(10) Patent No.: US 11,932,712 B2
(45) Date of Patent: Mar. 19, 2024

(54) METHOD OF TREATING SUBSTRATE

(71) Applicant: DAIKIN INDUSTRIES, LTD., Osaka (JP)

(72) Inventors: Hisako Nakamura, Osaka (JP); Michio Matsuda, Osaka (JP); Hirotoshi Sakashita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 553 days.

(21) Appl. No.: 17/065,102

(22) Filed: Oct. 7, 2020

(65) Prior Publication Data

US 2021/0102020 A1    Apr. 8, 2021

Related U.S. Application Data

(60) Provisional application No. 62/912,298, filed on Oct. 8, 2019.

(51) Int. Cl.
| | |
|---|---|
| *D06M 15/267* | (2006.01) |
| *C08F 220/14* | (2006.01) |
| *C08F 220/18* | (2006.01) |
| *C08F 220/28* | (2006.01) |
| *C08F 220/36* | (2006.01) |
| *C08F 220/38* | (2006.01) |

(52) U.S. Cl.
CPC ........ *C08F 220/365* (2020.02); *C08F 220/14* (2013.01); *C08F 220/1818* (2020.02); *C08F 220/281* (2020.02); *C08F 220/387* (2020.02); *D06M 15/267* (2013.01); *D06M 2200/01* (2013.01)

(58) Field of Classification Search
CPC ............ C08F 220/365; C08F 220/1818; C08F 220/281; C08F 220/387; C08F 220/14; D06M 15/267; D06M 2200/01
USPC .......................................................... 442/93
See application file for complete search history.

(56) References Cited

U.S. PATENT DOCUMENTS

| | | | |
|---|---|---|---|
| 2006/0140898 A1* | 6/2006 | Dubief ................ | A61Q 5/00 424/70.13 |
| 2008/0058475 A1* | 3/2008 | Schmidt ............. | C08F 293/005 525/242 |
| 2016/0136085 A1* | 5/2016 | Crane ................. | A61K 8/86 401/196 |
| 2020/0239613 A1 | 7/2020 | Yamamoto et al. | |

FOREIGN PATENT DOCUMENTS

| | | | | |
|---|---|---|---|---|
| EP | 372746 A | * | 6/1990 | ......... C08F 210/14 |
| EP | 581327 A1 | * | 2/1994 | ............. C14C 3/22 |
| WO | 2019/026593 A1 | | 2/2019 | |
| WO | 2020/054856 A1 | | 3/2020 | |

* cited by examiner

*Primary Examiner* — Kelechi C Egwim
(74) *Attorney, Agent, or Firm* — Sughrue Mion, PLLC

(57) ABSTRACT

Provided are a fluorine-free soil resistant agent and a soil resistant treatment method which give excellent water-repellency and excellent antifouling property to a substrate, especially a carpet. The soil resistant agent contains (1) a fluorine-free copolymer having (a) a repeating unit formed from an acrylic monomer having a hydrocarbon group containing 7 to 40 carbon atoms, and (b) a repeating unit formed from an acrylic monomer having a hydrophilic group, and (2) water or a mixture of water and an organic solvent dispersing the fluorine-free copolymer (1). A method of treating the substrate, includes applying the soil resistant agent to the substrate.

14 Claims, No Drawings

METHOD OF TREATING SUBSTRATE

CROSS-REFERENCE TO RELATED APPLICATIONS

This application claims benefit under 35 U.S.C. § 119(e) of U.S. Provisional Application 62/912,298 filed Oct. 8, 2019, incorporated herein by reference in its entirety.

TECHNICAL FIELD

The present disclosure relates to a method of treating substrate and a treated substrate.

Conventionally, fluorine-containing water repellent and oil-repellent agents comprising fluorine compounds are known. The water- and oil-repellent agents show good water- and oil-repellency, when substrates such as textiles are treated with the water- and oil-repellent agents.

The results of the latest researches [a report of the Environmental Protection Agency (EPA), "PRELIMINARY RISK ASSESSMENT OF THE DEVELOPMENTAL TOXICITY ASSOCIATED WITH EXPOSURE TO PERFLUOROOCTANOIC ACID AND ITS SALTS" (http://www.epa.gov/opptintr/pfoa/pfoara.pdf)] have taught that PFOA (perfluorooctanoic acid), one of long-chain fluoroalkyl compounds, is proved to have a danger to burden the environment. Under such a situation, EPA announced on Apr. 14, 2003 that the scientific investigation on PFOA should be more intensively executed.

On the other hand, Federal Register (FR Vol. 68, No. 73/Apr. 16, 2003 [FRL-2303-8]) (http://www.epa.gov/opptintr/pfoa/pfoafr.pdf), EPA Environmental News for release Monday Apr. 14, 2003 "EPA INTENSIFIES SCIENTIFIC INVESTIGATION OF A CHEMICAL PROCESSING AID" (http://www.epa.gov/opptintr/pfoa/pfoaprs.pdf), and EPA OPPT FACT SHEET Apr. 14, 2003 (http://www.epa.gov/opptintr/pfoa/pfoafacts.pdf) announced that a "telomer" may possibly metabolize or decompose to PFOA (herein, the telomer means a long-chain fluoroalkyl group).

It is also announced that the "telomer" is used in a large number of commercial products including fire fighting foams, care products and cleaning products as well as soil, stain and grease resistant coating on carpets, textiles, paper, and leather having the imparted water- and oil-repellency and soil resistance. There is the concern that the fluorine-containing compound is accumulated in environment.

Water- and oil-repellent agents, which do not contain fluorine compounds, have been proposed.

WO 2019/026593 A1 discloses a water repellent composition containing polymer having a repeating unit formed from an amide group-containing (meth)acrylate having a hydrocarbon group having 7 to 30 carbon atoms.

WO 2020/054856 A1 discloses an oil-resistant agent for paper, which comprises a fluorine-free copolymer having a repeating unit formed from (a) an acrylic monomer having a long-chain hydrocarbon group having 7 to 40 carbon atoms and a repeating unit formed from (b) an acrylic monomer having a hydrophilic group.

There is a demand for water- and oil-repellent agents which do not contain fluorine compounds, but there is no fluorine-free water- and oil-repellent agent excellent in both of water-repellency and soil resistance.

SUMMARY

An object of the present disclosure is to provide a fluorine-free soil resistant agent and a soil resistant treatment method which give excellent water-repellency and excellent soil resistance (i.e., a high antifouling property) to a substrate, especially a carpet.

The present disclosure relates to a soil resistant agent (i.e., an antifouling agent) comprising:
(1) a fluorine-free copolymer comprising:
  (a) a repeating unit formed from an acrylic monomer having a hydrocarbon group containing 7 to 40 carbon atoms, and
  (b) a repeating unit formed from an acrylic monomer having a hydrophilic group, and
(2) water or a mixture of water and an organic solvent dispersing the fluorine-free copolymer (1).

Preferred embodiments of the present disclosure are as follows.

Embodiment 1

A method of treating a substrate, comprising applying a soil resistant agent to the substrate,
wherein the soil resistant agent comprises:
(1) a fluorine-free copolymer comprising:
  (a) a repeating unit formed from an acrylic monomer having a hydrocarbon group containing 7 to 40 carbon atoms, and
  (b) a repeating unit formed from acrylic monomer having a hydrophilic group, and
(2) water or a mixture of water and an organic solvent dispersing the fluorine-free copolymer (1).

Embodiment 2

The method according to Embodiment 1, wherein the hydrocarbon group-containing acrylic monomer (a) is a monomer represented by the formula:

$$CH_2=C(-X^1)-C(=O)-Y^1(R^1)_k$$

wherein $R^1$ each is independently a hydrocarbon group having 7 to 40 carbon atoms,
$X^1$ is a hydrogen atom, a monovalent organic group or a halogen atom excluding a fluorine atom,
$Y^1$ is a group (excluding a hydrocarbon group) consisting of at least one selected from a divalent to tetravalent hydrocarbon group having 1 carbon atom, $-C_6H_4-$, $-O-$, $-C(=O)-$, $-S(=O)_2-$ and $-NH-$, and
k is an integer of 1 to 3.

Embodiment 3

The method according to Embodiment 1 or 2, wherein the hydrocarbon group-containing acrylic monomer (a) is:
(a1) an acrylic monomer represented by the formula:

$$CH_2=C(-X^4)-C(=O)-Y^2-R^2$$

wherein $R^2$ is a hydrocarbon group having 7 to 40 carbon atoms,
$X^4$ is a hydrogen atom, a monovalent organic group or a halogen atom excluding a fluorine atom, and
$Y^2$ is $-O-$ or $-NH-$, and/or
(a2) an acrylic monomer represented by the formula:

$$CH_2=C(-X^5)-C(=O)-Y^3-Z(-Y^4-R^3)_n$$

wherein $R^3$ each is independently a hydrocarbon group having 7 to 40 carbon atoms,
$X^5$ is a hydrogen atom, a monovalent organic group or a halogen atom excluding a fluorine atom,
$Y^3$ is $-O-$ or $-NH-$, $Y^4$ each is independently a direct bond, or a group consisting of at least one selected from, —O—, —C(=O)—, —S(=O)$_2$— and —NH—, and Z is a direct bond, or a divalent or trivalent group having 1 to 5 carbon atoms, and n is 1 or 2.

Embodiment 4

The method according to Embodiments 1 to 3, wherein, in the hydrocarbon group-containing acrylic monomer (a), the hydrocarbon group has 18 to 40 carbon atoms.

Embodiment 5

The method according to Embodiments 1 to 4, wherein the hydrophilic group-containing acrylic monomer (b) is represented by the formulas:

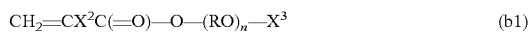

and/or

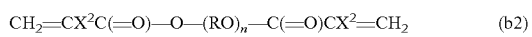

wherein $X^2$ is a hydrogen atom or a methyl group, $X^3$ is a hydrogen atom or an unsaturated or saturated hydrocarbon group having 1 to 22 carbon atoms, R each is independently an alkylene group having 2 to 6 carbon atoms, and n is an integer of 1 to 90.

Embodiment 6

The method according to Embodiments 1 to 5, wherein the fluorine-free copolymer (1) further comprises (c) a repeating unit formed from a monomer having an ion-donating group, other than the monomers (a) and (b).

Embodiment 7

The method according to Embodiments 1 to 6, wherein the monomer (c) is a monomer wherein a homopolymer thereof has a glass transition point or melting point of at least 70° C.

Embodiment 8

The method according to Embodiments 1 to 7, wherein the amount of the repeating unit formed from the hydrocarbon group-containing acrylic monomer (a) is 30 to 97% by weight, based on the copolymer, the amount of the repeating unit formed from the hydrophilic group-containing acrylic monomer (b) is 3 to 70% by weight, based on the total of the acrylic monomers (a) and (b), and the amount of monomer (c) is 0.1 to 60% by weight, based on the copolymer.

Embodiment 9

The method according to Embodiments 1 to 8, wherein the fluorine-free copolymer (1) is a random copolymer.

Embodiment 10

The method according to Embodiments 1 to 9, wherein the soil resistant agent further comprises:

(3) an acrylic blender having a repeating unit formed from a monomer in which a homopolymer of the monomer has a glass transition point or melting point of at least 70° C.

Embodiment 11

The method according to Embodiments 1 to 10, wherein the acrylic blender is a homopolymer or copolymer of at least one monomer selected from the group consisting of amidoethyl stearate acrylate (melting point: 92° C.), methyl methacrylate (glass transition point: 105° C.), acrylic acid (glass transition point: 106° C.) and methacrylic acid (glass transition point: 185° C.).

Embodiment 12

The method according to Embodiments 1 to 11, wherein, in the polymer of the acrylic blender, the amount of the monomer, in which a homopolymer of the monomer has a glass transition point or melting point of at least 70° C., is at least 30 wt %, based on the polymer.

Embodiment 13

A substrate prepared by treating by the method according Embodiments 1 to 12.

Embodiment 14

The substrate according to Embodiment 13, which is a carpet.

Embodiment 15

A carpet containing a fluorine-free copolymer (1) in the carpet or on surfaces of the carpet, wherein the fluorine-free copolymer (1) comprises (a) a repeating unit formed from an acrylic monomer containing a hydrocarbon group having 7 to 40 carbon atoms, and (b) a repeating unit formed from an acrylic monomer having a hydrophilic group.

DETAILED DESCRIPTION

The soil resistant agent of the present disclosure comprises:

(1) a fluorine-free copolymer, and (2) an aqueous medium which is water or a mixture of water and an organic solvent.

The soil resistant agent may further comprise (3) an acrylic blender.

(1) Fluorine-Free Copolymer

The fluorine-free copolymer (1) comprises:

(a) a repeating unit formed from an acrylic monomer having a hydrocarbon group containing 7 to 40 carbon atoms, and (b) a repeating unit formed from an acrylic monomer having a hydrophilic group.

Preferably, the fluorine-free copolymer (1) comprises:

(c) a repeating unit formed from a monomer having an ion-donating group, in addition to the monomers (a) and (b).

The fluorine-free copolymer may comprise:

(d) a repeating unit formed from another monomer, in addition to the monomers (a) and (b) (and the monomer (c)).

(a) Acrylic Monomer Having a Long-Chain Hydrocarbon Group

The long-chain hydrocarbon group-containing monomer has a hydrocarbon group having 7 to 40 carbon atoms. The long-chain hydrocarbon group is preferably a linear or branched hydrocarbon group having 7 to 40 carbon atoms. The number of carbon atoms in the linear or branched hydrocarbon group may be 10 to 40, 12 to 30 or 15 to 30. The linear or branched hydrocarbon group has preferably 12 to 40, more preferably 12 to 30, particularly preferably 18 to 28, especially preferably 18 to 22 (or 18 to 24) carbon atoms, and is preferably a saturated aliphatic hydrocarbon group, particularly an alkyl group. The long-chain hydrocarbon group is particularly preferably a stearyl group, an icosyl group or a behenyl group.

The long-chain hydrocarbon group-containing fluorine-free monomer is preferably a monomer of the formula:

$$CH_2=C(-X^1)-C(=O)-Y^1 \quad (R^1)k$$

wherein $R^1$ each is independently a hydrocarbon group having 7 to 40 carbon atoms, $X^1$ is a hydrogen atom, a monovalent organic group or a halogen atom excluding a fluorine atom, $Y^1$ is a group (excluding a hydrocarbon group) consisting of at least one selected from a divalent to tetravalent hydrocarbon group having 1 carbon atom, —$C_6H_4$—, —O—, —C(=O)—, —S(=O)$_2$— and —NH—, and k is an integer of 1 to 3.

$X^1$ may be a hydrogen atom, a methyl group, a halogen except for a fluorine atom, a cyano group, a substituted or unsubstituted benzyl group, or a substituted or unsubstituted phenyl group. Examples of $X^1$ include a hydrogen atom, a methyl group, a chlorine atom, a bromine atom, an iodine atom and a cyano group. $X^1$ is preferably a hydrogen atom, a methyl group or a chlorine atom. $X^1$ is particularly preferably a hydrogen atom, because of higher water repellency and higher soil resistance.

Y' is a divalent to tetravalent group. Y' is preferably a divalent group.

$Y^1$ is preferably a group containing at least one selected from a hydrocarbon group having 1 carbon atom, —$C_6H_6$—, —O—, —C(=O)—, —S(C=O)$_2$ and —NH— (wherein $Y^1$ is not a hydrocarbon group). Examples of the hydrocarbon group having 1 carbon atom include —$CH_2$—, —CH= and —C≡.

Examples of $Y^1$ include —Y'—, —Y'—C(=O)—, —C(=O)—Y'—, —Y'—C(=O)—Y'—, —Y'—C(=O)—Y'—, —Y'—R'—, —Y'—R'—Y'—, —Y'—R'—Y'—C(=O)—, —Y'—R'—C(=O)—Y'—, —Y'—R'—Y'—C(=O)—Y'—and Y'—R'—Y'—R'— wherein Y' is a direct bond, —O— or —NH—,

R' is —$(CH_2)_m$— (wherein m is an integer of 1 to 5) or —$C_6H_6$-(phenylene group).

Specific examples of $Y^1$ include —O—, —NH—, —O—C(=O)—, —C(=O)—NH—, —NH—C(=O)—, —O—C(=O)—NH—, —NH—C(=O)—O—, —NH—C(=O)—NH—, —O—$C_6H_4$—, —O—$(CH_2)_m$—O—, —NH—$(CH_2)_m$—NH—, —O—$(CH_2)_m$—NH—, —NH—$(CH_2)_m$—O—, —O—$(CH_2)_m$—O—C(=O)—, —O—$(CH_2)_m$—C(=O)—O—, —NH—$(CH_2)_m$—O—C(=O)—, —NH—$(CH_2)_m$—O—C(=O)—NH—, —O—$(CH_2)_m$—NH—C(=O)—O—, —O—$(CH_2)_m$—C(=O)—NH—, —O—$(CH_2)_m$—NH—C—(=O)—, —O—$(CH_2)_m$—NH—C(=O)—NH—, —O—$(CH_2)_m$—S(=O)$_2$—NH—, —O—$(CH_2)_m$—NH—S(=O)$_2$—, —O—$(CH_2)_m$—O—$C_6H_4$—, —NH—$(CH_2)_m$—O—C(=O)—NH—, —NH—$(CH_2)_m$—NH—C(=O)—

—O—, —NH—$(CH_2)_m$—C(=O)—NH—, —NH—$(CH_2)_m$—NH—C(=O)—, —NH—$(CH_2)_m$—NH—C(=O)—NH—, —NH—$(CH_2)_m$—O—$C_6H_4$—, and —NH—$(CH_2)_m$—NH—$C_6H_4$— wherein m is an integer of 1 to 5, particularly 2 or 4.

$Y^1$ is more preferably —O—, —NH—, —O—$(CH_2)_m$—O—C(=O)—, —O—$(CH_2)_m$—NH—C(=O)—, —O—$(CH_2)_m$—O—C(=O)—NH—, —O—$(CH_2)_m$—NH—C(=O)—O—, —O—$(CH_2)_m$—NH—C(=O)—NH—, —O—$(CH_2)_m$—NH—S(=O)$_2$— or —O—$(CH_2)_m$—S(=O)$_2$—NH— wherein m is an integer of 1 to 5, particularly 2 or 4.

$Y^1$ is particularly preferably —O—, —NH—, —O—$(CH_2)_m$—NH—C(=O)—, —O—$(CH_2)_m$—O—C(=O)—NH—, —O—$(CH_2)_m$—NH—C(=O)—O—, —O—$(CH_2)_m$—NH—C(=O)—NH—, especially —O—$(CH_2)_m$—NH—C(=O)—, wherein m is an integer of 1 to 5, particularly 2 or 4.

$R^1$ is preferably a linear or branched hydrocarbon group. The hydrocarbon group may be particularly a linear hydrocarbon group. The hydrocarbon group is preferably an aliphatic hydrocarbon group, particularly a saturated aliphatic hydrocarbon group, especially an alkyl group. The number of carbon atoms in the hydrocarbon group is preferably 12 to 30, for example 15 to 26, particularly 17 to 22.

k is an integer of 1 to 3, preferably 1.

Examples of the long-chain hydrocarbon group-containing fluorine-free monomer (A2) include:

(a1) an acrylic monomer represented by the formula:

$$CH_2=C(-X^4)-C(=O)-Y^2-R^2$$

wherein $R^2$ is a hydrocarbon group having 7 to 40 carbon atoms, $X^4$ is a hydrogen atom, a monovalent organic group or a halogen atom excluding a fluorine atom, and $Y^2$ is —O— or —NH—, and (a2) an acrylic monomer represented by the formula:

$$CH_2=C(-X^5)-C(=O)-Y^3-Z(-Y^4-R^3)_n$$

wherein $R^3$ each is independently a hydrocarbon group having 7 to 40 carbon atoms, $X^5$ is a hydrogen atom, a monovalent organic group or a halogen atom excluding a fluorine atom, $Y^3$ is —O— or —NH—, $Y^4$ each is independently a direct bond, or a group consisting of at least one selected from, —O—, —C(=O)—, —S(=O)$_2$— and —NH—, and Z is a direct bond, or a divalent or trivalent group having 1 to 5 carbon atoms, and n is 1 or 2.

(a1) Acrylic Monomer

The acrylic monomer (a1) is a compound of the formula:

$$CH_2=C(-X^4)-C(=O)-Y^2-R^2$$

wherein $R^2$ is a hydrocarbon group having 7 to 40 carbon atoms, $X^4$ is a hydrogen atom, a monovalent organic group or a halogen atom excluding a fluorine atom, and $Y^2$ is —O— or —NH—.

The acrylic monomer (a1) is a long-chain acrylate ester monomer in which $Y^2$ is —O—; or a long-chain acrylamide monomer in which $Y^2$ is —NH—.

$R^2$ is preferably a linear or branched hydrocarbon group. The hydrocarbon group may be particularly a linear hydrocarbon group. The hydrocarbon group is preferably an aliphatic hydrocarbon group, particularly a saturated aliphatic hydrocarbon group, especially an alkyl group. The number of carbon atoms in the hydrocarbon group is preferably 12 to 30, for example 16 to 26, particularly 18 to 22.

$X^4$ may be a hydrogen atom, a methyl group, a halogen except for a fluorine atom, a cyano group, a substituted or unsubstituted benzyl group or a substituted or unsubstituted phenyl group. Examples of $X^4$ include a hydrogen atom, a methyl group, a chlorine atom, a bromine atom, an iodine atom and a cyano group. $X^4$ is preferably a hydrogen atom, a methyl group or a chlorine atom. $X^4$ is particularly preferably a hydrogen atom, because of higher water repellency and higher soil resistance.

Specific examples of the long-chain acrylate ester monomer include lauryl (meth)acrylate, stearyl (meth)acrylate, icosyl (meth)acrylate, behenyl (meth)acrylate, stearyl α-chloroacrylate, icosyl α-chloroacrylate and behenyl α-chloroacrylate.

Specific examples of the long-chain acrylamide monomer include lauryl (meth)acrylamide, stearyl (meth)acrylamide, icosyl (meth)acrylamide and behenyl (meth)acrylamide.

The long-chain acrylate ester monomer and/or the long-chain acrylamide monomer enhance water-repellency and feeling which are imparted by the fluorine-free polymer.

(a2) Acrylic Monomer

The acrylic monomer (a2) is a compound different from the acrylic monomer (a1). The acrylic monomer (a2) is a (meth)acrylate or a (meth)acrylamide having a group consisting of at least one selected from —O—, —C(=O)—, —S(=O)$_2$—, or —NH—.

The acrylic monomer (a2) is a compound of the formula:

$$CH_2=C(-X^5)-C(=O)-Y^3-Z(-Y^4-R^3)_n$$

wherein $R^3$ each is independently a hydrocarbon group having 7 to 40 carbon atoms, $X^5$ is a hydrogen atom, a monovalent organic group or a halogen atom excluding a fluorine atom, $Y^3$ is —O— or —NH—, $Y^4$ each is independently a direct bond, or a group consisting of at least one selected from, —O—, —C(=O)—, —S(=O)$_2$— and —NH—, and Z is a direct bond, or a divalent or trivalent group having 1 to 5 carbon atoms, and n is 1 or 2.

The acrylic monomer (a2) is a long-chain acrylate ester monomer in which $Y^3$ is —O—; or a long-chain acrylamide monomer in which $Y^3$ is —NH—.

$R^3$ is preferably a linear or branched hydrocarbon group. The hydrocarbon group may be particularly a linear hydrocarbon group. The hydrocarbon group is preferably an aliphatic hydrocarbon group, particularly a saturated aliphatic hydrocarbon group, especially an alkyl group. The number of carbon atoms in the hydrocarbon group is preferably 12 to 30, for example, 15 to 26, or 16 to 26, particularly 17 to 22 (or 18 to 24).

$X^5$ may be a hydrogen atom, a methyl group, a halogen except for a fluorine atom, a cyano group, a substituted or unsubstituted benzyl group or a substituted or unsubstituted phenyl group. Examples of $X^5$ include a hydrogen atom, a methyl group, a chlorine atom, a bromine atom, an iodine atom and a cyano group. $X^5$ is preferably a hydrogen atom, a methyl group or a chlorine atom, more preferably a hydrogen atom or a methyl group, particularly preferably a hydrogen atom, because of higher water repellency and higher antifouling property.

Examples of $Y^4$ include —Y'—, —Y'—Y'—, —Y'—C(=O)—, —C(=O)—Y'—, —Y'—C(=O)—Y'—, —Y'—R'—, —Y'—R'—Y'—, —Y'—R'—Y'—C(=O)—, —Y'—R'—C(=O)—Y'—, —Y'—R'—Y'—C(=O)—Y'—, or —Y'—R'—Y'—R'— wherein each Y' is independently a direct bond, —O—, —NH— or —S(=O)$_2$—, and each R' is independently —(CH$_2$)$_m$—, where m is an integer of 1 to 5, a linear hydrocarbon group of 1 to 5 carbon atoms having an unsaturated bond, a hydrocarbon group of 1 to 5 carbon atoms having a branched structure, or —(CH$_2$)$_l$—C$_6$H$_4$—(CH$_2$)$_l$—, where each l is independently an integer of 0 to 5, and —C$_6$H$_4$— is a phenylene group.

Specific examples of $Y^4$ include a direct bond, —O—, —NH—, —O—C(=O)—, —C(=O)—O—, —C(=O)—NH—, —NH—C(=O)—, —S(=O)$_2$—NH—, —NH—S(=O)$_2$—, —O—C(=O)—NH—, —NH—C(=O)—O—, —NH—C(=O)—NH—, —O—C$_6$H$_4$—, —NH—C$_6$H$_4$—, —O—(CH$_2$)$_m$—O—, —NH—(CH$_2$)$_m$—NH—, —O—(CH$_2$)$_m$—NH—, —NH—(CH$_2$)$_m$—O—, —O—(CH$_2$)$_m$—O—C(=O)—, —O—(CH$_2$)$_m$—C(=O)—O—, —NH—(CH$_2$)$_m$—O—C(=O)—, —NH—(CH$_2$)$_m$—C(=O)—O—, —O—(CH$_2$)$_m$—O—C(=O)—NH—, —O—(CH$_2$)$_m$—NH—C(=O)—O—, —O—(CH$_2$)$_m$—C(=O)—NH—, —O—(CH$_2$)$_m$—NH—C(=O)—, —O—(CH$_2$)$_m$—NH—C(=O)—NH—, —O—(CH$_2$)$_m$—O—C$_6$H$_4$—, —NH—(CH$_2$)$_m$—O—C(=O)—NH—, —NH—(CH$_2$)$_m$—NH—C(=O)—O—, —NH—(CH$_2$)$_m$—C(=O)—NH—, —NH—(CH$_2$)$_m$—NH—C(=O)—, —NH—(CH$_2$)$_m$—NH—C(=O)—NH—, —NH—(CH$_2$)$_m$—O—C$_6$H$_4$—, and —NH—(CH$_2$)$_m$—NH—C$_6$H$_4$— wherein m is an integer of 1 to 5, particularly 2 or 4.

$Y^4$ is more preferably —O—, —NH—, —O—C(=O)—, —C(=O)—O—, —C(=O)—NH—, —NH—C(=O)—, —NH—S(=O)$_2$—, —S(=O)$_2$—NH—, —O—C(=O)—NH—, —NH—C(=O)—O—, —NH—C(=O)—NH—, or —O—C$_6$H$_4$— wherein m is an integer of 1 to 5, particularly 2 or 4.

Particularly preferably, $Y^4$ is —NH—C(=O)—, —C(=O)—NH—, —O—C(=O)—NH—, —NH—C(=O)—O— or —NH—C(=O)—NH—.

Z is a direct bond or a divalent or trivalent hydrocarbon group containing 1 to 5 carbon atoms, which may have a linear structure or a branched structure. Preferably, Z has 2 to 4 carbon atoms, particularly 2 carbon atoms. Specific examples of Z include a direct bond, —CH$_2$—, —CH$_2$CH$_2$—, —CH$_2$CH$_2$CH$_2$—, —CH$_2$CH$_2$CH$_2$CH$_2$—, —CH$_2$CH$_2$CH$_2$CH$_2$CH$_2$—, —CH$_2$CH= having a branched structure, —CH$_2$(CH—)CH$_2$— having a branched structure, —CH$_2$CH$_2$CH= having a branched structure, —CH$_2$CH$_2$CH$_2$CH$_2$CH= having a branched structure, —CH$_2$CH$_2$(CH—)CH$_2$— having a branched structure, and —CH$_2$CH$_2$CH$_2$CH= having a branched structure.

Z is preferably not a direct bond, and $Y^4$ and Z are not a direct bond at the same time.

The acrylic monomer (a2) is preferably $$CH_2=C(-X^5)-C(=O)-O-(CH_2)_m-NH-C(=O)-R^3,$$

$$CH_2=C(-X^5)-C(=O)-O-(CH_2)_m-O-C(=O)-NH-R^3,$$

$$CH_2=C(-X^5)-C(=O)-O-(CH_2)_m-NH-C(=O)-O-R^3, \text{ or}$$

$$CH_2=C(-X^5)-C(=O)-O-(CH_2)_m-NH-C(=O)-NH-R^3,$$

wherein $R^3$, $X^5$ and m are as defined above. The acrylic monomer (a2) is particularly preferably $CH_2=C(-X^5)-C(=O)-O-(CH_2)_m-NH-C(=O)-R^3$ wherein $R^3$, $X^5$ and m are as defined above.

The acrylic monomer (a2) can be produced by reacting a hydroxyalkyl (meth)acrylate or a hydroxyalkyl (meth)acrylamide with a long-chain alkyl isocyanate. Examples of the long-chain alkyl isocyanate include lauryl isocyanate, myristyl isocyanate, cetyl isocyanate, stearyl isocyanate, oleyl isocyanate and behenyl isocyanate.

Alternatively, the acrylic monomer (a2) can be produced by reacting a long-chain alkylamine or a long-chain alkyl alcohol with a (meth)acrylate having an isocyanate group on side chain, for example 2-methacryloyloxyethyl isocyanate. Examples of the long-chain alkylamine include laurylamine, myristylamine, cetylamine, stearylamine, oleylamine and behenylamine. Examples of the long-chain alkyl alcohol include lauryl alcohol, myristyl alcohol, cetyl alcohol, stearyl alcohol, coleyl alcohol and behenyl alcohol.

Specific examples of the acrylic monomer (a2) are as follows. stearyl (meth) acrylate, behenyl (meth) acrylate, stearyl α-chloroacrylate, behenyl α-chloroacrylate; stearyl (meth) acrylamide, behenyl (meth) acrylamide;

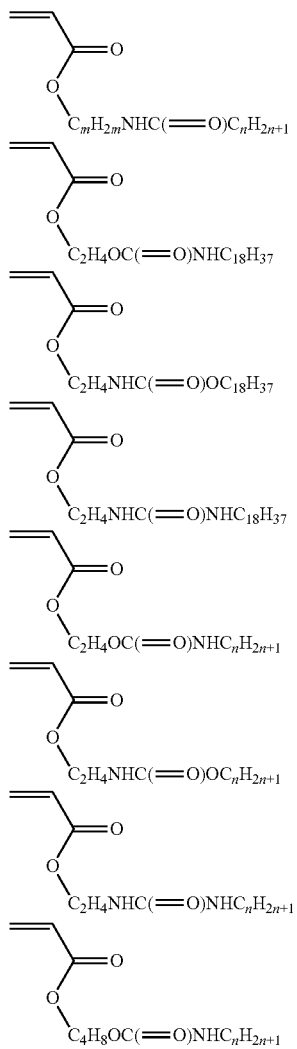

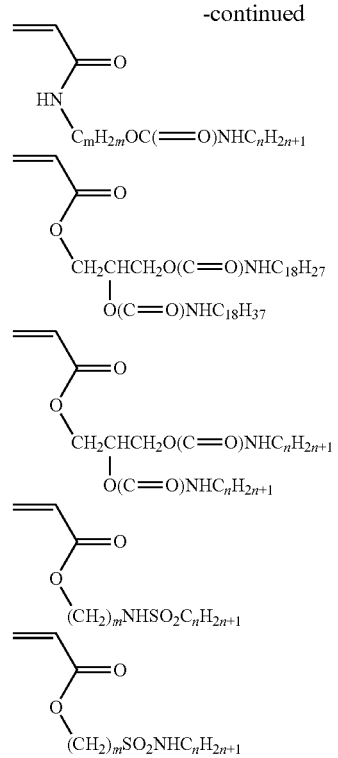

wherein m is an integer of 1 to 5, n is an integer of 7 to 40.

The compounds having the above chemical formulas are an acrylic compound in which the α-position is a hydrogen atom, and specific examples may be a methacrylic compound in which the α-position is a methyl group and an α-chloroacrylic compound in which the α-position is a chlorine atom.

Typical specific examples of the acrylic monomer (a2) include palmitic acid amidoethyl (meth)acrylate, stearic acid amidoethyl (meth)acrylate (i.e., amidoethyl stearate (meth)acrylate), behenic acid amidoethyl (meth)acrylate and myristic acid amidoethyl (meth)acrylate.

The melting point of the long-chain hydrocarbon group-containing acrylic monomer (a) is preferably at least 10° C., more preferably at least 25° C. or at least 40° C.

The long-chain hydrocarbon group-containing acrylic monomer (a) is preferably an acrylate in which each of $X^1$, $X^4$ and $X^5$ is a hydrogen atom.

The acrylic monomer (a2) is particularly preferably an amide group-containing monomer of the formula:

$$R^{12}-C(=O)-NH-R^{13}-O-R^{11}$$

wherein $R^{11}$ is an organic residue having an ethylenically unsaturated polymerizable group, $R^{12}$ is a hydrocarbon group having 7 to 40 carbon atoms, and $R^{13}$ is a hydrocarbon group having 1 to 5 carbon atoms.

$R^{11}$ is an organic residue having an ethylenically unsaturated polymerizable group, and is not limited as long as the group has a carbon-carbon double bond. Specific examples thereof include organic residues having ethylenically unsaturated polymerizable groups such as $-C(=O)CR^{14}=CH_2$, $-CHR^{14}=CH_2$ and $-CH_2CHR^{14}=CH_2$, where $R^{14}$ is a hydrogen atom or an alkyl group having 1 to 4 carbon atoms. $R^{11}$ may have any of various organic groups in addition to an ethylenically unsaturated polymerizable group, and examples thereof include organic groups such as chain hydrocarbons, cyclic hydrocarbons, polyoxyalkylene groups and polysiloxane groups. For example, these organic groups may be substituted with various substituents. $R^{11}$ is preferably —C(=O)CR$^{14}$=CH$_2$.

$R^{12}$ is a hydrocarbon group having 7 to 40 carbon atoms, preferably an alkyl group having 7 to 40 carbon atoms, and examples thereof include chain hydrocarbons and cyclic hydrocarbons. Among them, chain hydrocarbons are preferable, and linear saturated hydrocarbon groups are particularly preferable. The number of carbon atoms of $R^{12}$ is 7 to 40, preferably 11 to 27, particularly 15 to 23.

$R^{13}$ is a hydrocarbon group having 1 to 5 carbon atoms, preferably an alkyl group having 1 to 5 carbon atoms. For example, the hydrocarbon group having 1 to 5 carbon atoms may be linear or branched, and may have an unsaturated bond. The hydrocarbon group is preferably linear. The number of carbon atoms of $R^{13}$ is preferably 2 to 4, particularly 2. $R^{13}$ is preferably an alkylene group.

The amide group-containing monomer may be one having a single group as $R^{11}$ (e.g. only a compound in which $R^{11}$ has 17 carbon atoms), or one having a combination of a plurality of groups as $R^{11}$ (e.g. a mixture of a compound in which $R^{11}$ has 17 carbon atoms and a compound in which $R^{12}$ has 15 carbon atoms).

Examples of the amide group-containing monomer include carboxylic acid amidealkyl (meth)acrylates.

Specific examples of the amide group-containing monomer include palmitic acid amidoethyl (meth)acrylate, stearic acid amidoethyl (meth)acrylate, behenic acid amidoethyl (meth)acrylate, myristic acid amidoethyl (meth)acrylate, lauric acid amidoethyl (meth)acrylate, isostearic acid ethylamide (meth)acrylate, oleic acid ethylamide (meth)acrylate, tertiary butylcyclohexyl caproic acid amidoethyl (meth)acrylate, adamantanecarboxylic acid ethylamide (meth)acrylate, naphthalenecarboxylic acid amidoethyl (meth)acrylate, anthracenecarboxylic acid amidoethyl (meth)acrylate, palmitic acid amidopropyl (meth)acrylate, stearic acid amidopropyl (meth)acrylate, palmitic acid amidoethyl vinyl ether, stearic acid amidoethyl vinyl ether, palmitic acid amidoethyl allyl ether, stearic acid amidoethyl allyl ether and mixtures thereof.

The amide group-containing monomer is preferably stearic acid amidoethyl (meth)acrylate. The amide group-containing monomer may be a mixture containing stearic acid amidoethyl (meth)acrylate. In the mixture containing stearic acid amidoethyl (meth)acrylate, the amount of the stearic acid amidoethyl (meth)acrylate may be, for example, 55 to 99 wt %, preferably 60 to 85 wt %, more preferably 65 to 80 wt %, based on the weight of all amide group-containing monomers, and the other monomers may be, for example, palmitic acid amidoethyl (meth)acrylate.

(b) Acrylic Monomer Having a Hydrophilic Group

The hydrophilic group-containing acrylic monomer (b) is a monomer excluding the monomer (a), and is a hydrophilic monomer. The hydrophilic group is preferably an oxyalkylene group (The carbon number of alkylene group is 2 to 6). In particular, the hydrophilic group-containing acrylic monomer (b) is preferably a polyalkylene glycol mono(meth)acrylate and/or a polyalkylene glycol di(meth)acrylate. The polyalkylene glycol mono(meth)acrylate and the polyalkylene glycol di(meth)acrylate may be compounds respectively represented by general formulas:

$$CH_2=CX^2C(=O)-O-(RO)_n-X^3 \quad (b1)$$

and $$CH_2=CX^2C(=O)-O-(RO)_n-C(=O)CX^2=CH_2 \quad (b2)$$

wherein
$X^2$ each is independently a hydrogen atom or a methyl group,
$X^3$ is a hydrogen atom or an unsaturated or saturated hydrocarbon group having 1 to 22 carbon atoms,
R each is independently an alkylene group having 2 to 6 carbon atoms, and
n is an integer of 1 to 90.
n may be, for example, 1 to 50, especially 1 to 30, specifically 1 to 15 or 2 to 15. Alternatively, n may be, for example, 1.

R may be a linear or branched alkylene group, for example, —(CH$_2$)$_x$— [wherein x is 2 to 6] or —(CH$_2$)$_{x1}$—(CH(CH$_3$))$_{x2}$— [wherein x1 and x2 each is 0 to 6, for example, 2 to 5, the total of x1 and x2 is 1 to 4. An order of —(CH$_2$)$_{x1}$— and —(CH(CH$_3$))$_{x2}$— is not limited to the described formula and may be random]. In —(RO)$_n$—, R may be at least two types (for example, 2 to 4 types, particularly 2 types). The —(RO)$_n$— group may be, for example, a combination of —(R$^1$O)$_{n1}$— and —(R$^2$O)$_{n2}$— wherein $R^1$ and $R^2$ are, different from each other, an alkylene group having 2 to 6 carbon atoms, n1 and n2 is independently an integer of at least 1, and the total of n1 and n2 is 2 to 90.

R in formulas (b1) and (b2) is particularly preferably an ethylene group, a propylene group, or a butylene group. R in formulas (b1) and (b2) may be a combination of at least two types of alkylene groups. In that case, at least one of R is preferably an ethylene group, a propylene group, or a butylene group. Examples of the combination of R include an ethylene group/propylene group combination, a propylene group/butylene group combination, and an ethylene group/butylene group combination. The monomer (b) may be a mixture of at least two types. In that case, at least one monomer (b) preferably has an ethylene group, a propylene group, or a butylene group for R in formula (b1) or (b2). When the polyalkylene glycol di(meth)acrylate represented by formula (b2) is used, it is not preferable to use the monomer (b2) alone as the monomer (b), and it is preferable to use a combination the monomer (b2) with monomer (b1). Even in this case, the compound represented by formula (b2) is preferably kept in an amount of less than 30% by weight (for example, 1% to 20% by weight), based on the monomer (b).

Specific examples of the hydrophilic group-containing acrylic monomer (b) include, but are not limited to, the following.

$$CH_2=CHCOO-CH_2CH_2O-H$$

$$CH_2=CHCOO-CH_2CH_2CH_2O-H$$

$$CH_2=CHCOO-CH_2CH(CH_3)O-H$$

$$CH_2=CHCOO-CH(CH_3)CH_2O-H$$

$$CH_2=CHCOO-CH_2CH_2CH_2CH_2O-H$$

$$CH_2=CHCOO-CH_2CH_2CH(CH_3)O-H$$

$$CH_2=CHCOO-CH_2CH(CH_3)CH_2O-H$$

$$CH_2=CHCOO-CH(CH_3)CH_2CH_2O-H$$

$$CH_2=CHCOO-CH_2CH(CH_2CH_3)O-H$$

$$CH_2=CHCOO-CH_2C(CH_3)_2O-H$$

$$CH_2=CHCOO-CH(CH_2CH_3)CH_2O-H$$

$CH_2=CHCOO-C(CH_3)_2CH_2O-H$ $CH_2=CHCOO-CH(CH_3)CH(CH_3)O-H$ $CH_2=CHCOO-C(CH_3)(CH_2CH_3)O-H$ $CH_2=CHCOO-(CH_2CH_2O)_2-H$ $CH_2=CHCOO-(CH_2CH_2O)_4-H$ $CH_2=CHCOO-(CH_2CH_2O)_5-H$ $CH_2=CHCOO-(CH_2CH_2O)_6-H$ $CH_2=CHCOO-(CH_2CH_2O)_{23}-CH_3$ $CH_2=CHCOO-(CH_2CH_2O)_{90}-CH_3$ $CH_2=CHCOO-(CH_2CH(CH_3)O)_9-H$ $CH_2=CHCOO-(CH_2CH(CH_3)O)_9-CH_3$ $CH_2=CHCOO-(CH_2CH(CH_3)O)_{12}-CH_3$ $CH_2=CHCOO-(CH_2CH_2O)_5-(CH_2CH(CH_3)O)_2-H$ $CH_2=CHCOO-(CH_2CH_2O)_5-(CH_2CH(CH_3)O)_3-CH_3$ $CH_2=CHCOO-(CH_2CH_2O)_8-(CH_2CH(CH_3)O)_6-CH_2CH(C_2H_5)C_4H_9$ $CH_2=CHCOO-(CH_2CH_2O)_{23}-OOC(CH_3)C=CH_2$ $CH_2=CHCOO-(CH_2CH_2O)_{26}-(CH_2CH(CH_3)O)_5-CH_2-CH=CH_2$ $CH_2=CHCOO-(CH_2CH_2O)_9-H$ $CH_2=C(CH_3)COO-CH_2CH_2O-H$ $CH_2=C(CH_3)COO-CH_2CH_2CH_2O-H$ $CH_2=C(CH_3)COO-CH_2CH(CH_3)O-H$ $CH_2=C(CH_3)COO-CH(CH_3)CH_2O-H$ $CH_2=C(CH_3)COO-CH_2CH_2CH_2CH_2O-H$ $CH_2=C(CH_3)COO-CH_2CH_2CH(CH_3)O-H$ $CH_2=C(CH_3)COO-CH_2CH(CH_3)CH_2O-H$ $CH_2=C(CH_3)COO-CH(CH_3)CH_2CH_2O-H$ $CH_2=C(CH_3)COO-CH_2CH(CH_2CH_3)O-H$ $CH_2=C(CH_3)COO-CH_2C(CH_3)_{20}-H$ $CH_2=C(CH_3)COO-CH(CH_2CH_3)CH_2O-H$ $CH_2=C(CH_3)COO-C(CH_3)_2CH_2O-H$ $CH_2=C(CH_3)COO-CH(CH_3)CH(CH_3)O-H$ $CH_2=C(CH_3)COO-C(CH_3)(CH_2CH_3)O-H$ $CH_2=C(CH_3)COO-(CH_2CH_2O)_9-H$ $CH_2=C(CH_3)COO-(CH_2CH_2O)_5-CH_3$ $CH_2=C(CH_3)COO-(CH_2CH_2O)_9-CH_3$ $CH_2=C(CH_3)COO-(CH_2CH_2O)_{23}-CH_3$ $CH_2=C(CH_3)COO-(CH_2CH_2O)_{90}-CH_3$ $CH_2=C(CH_3)COO-(CH_2CH(CH_3)O)_9-H$ $CH_2=CHCOO-(CH_2CH(CH_3)O)_9-H$ $CH_2=C(CH_3)COO-(CH_2CH(CH_3)O)_9-CH_3$ $CH_2=C(CH_3)COO-(CH_2CH(CH_3)O)_{12}-CH_3$ $CH_2=C(CH_3)COO-(CH_2CH_2O)_5-(CH_2CH(CH_3)O)_2-H$ $CH_2=C(CH_3)COO^-(CH_2CH_2O)_5-(CH_2CH(CH_3)O)_3-CHs$ $CH_2=C(CH_3)COO^-(CH_2CH_2O)_8-(CH_2CH(CH_3)O)_6-CH_2CH(C_2H_5)C_4H_9$ $CH_2=C(CH_3)COO-(CH_2CH_2O)_{23}-OOC(CH_3)C=CH_2$ $CH_2=C(CH_3)COO-(CH_2CH_2O)_{20}-(CH_2CH(CH_3)O)_5-CH_2-CH=CH_2$

The monomer (b) is preferably an acrylate in which $X^2$ is a hydrogen atom, and is particularly preferably hydroxyethyl acrylate, hydroxypropyl acrylate, and hydroxybutyl acrylate.

(c) Monomer Having an Ion-Donating Group

The ion-donating group-containing monomer (c) is a monomer other than the monomers (a) and (b). Generally, the monomer (c) is a monomer having an ethylenically unsaturated double bond and an ion-donating group. The ion-donating group is an anion-donating group and/or a cation-donating group.

The anion-donating group-containing monomer includes a monomer having a carboxyl group, a sulfonic acid group or a phosphoric acid group. Specific examples of the anion-donating group-containing monomer are (meth)acrylic acid, crotonic acid, maleic acid, fumaric acid, itaconic acid, citraconic acid, vinyl sulfonic acid, (meth)allyl sulfonic acid, styrene sulfonic acid, phosphate acrylate, vinylbenzene sulfonic acid, acrylamido tert-butyl sulfonic acid, and salts thereof.

Examples of the salt of the anion-donating group include an alkali metal salt, an alkaline earth metal salt, and an ammonium salts such as a methyl ammonium salt, an ethanol ammonium salt and a triethanol ammonium salt.

In the monomer having the cation-donating group, examples of the cation-donating group include an amino group, preferably a tertiary amino group and a quaternary amino group. Preferably, in the tertiary amino group, two groups attached to a nitrogen atom are, the same or different, an aliphatic group having 1 to 5 carbon atoms (particularly an alkyl group), an aromatic group having 6 to 20 carbon atoms (an aryl group), or an aromatic aliphatic group having 7 to 25 carbon atoms (particularly an aralkyl group, for example, a benzyl group ($C_6H_5-CH_2-$)). Preferably, in the quaternary amino group, three groups bonded to a nitrogen atom are, the same or different, an aliphatic group having 1 to 5 carbon atoms (particularly an alkyl group), an aromatic group having 6 to 20 carbon atoms (an aryl group), or an aromatic aliphatic group having 7 to 25 carbon atoms (particularly an aralkyl group, for example, a benzyl group ($C_6H_5-CH_2-$)). In the tertiary and quaternary amino groups, one remaining group bonded to the nitrogen atom may have a carbon-carbon double bond. The cation-donating group may be in the form of a salt.

The cation-donating group, which is a salt, is a salt with an acid (an organic or inorganic acid). Organic acids such as carboxylic acids having 1 to 20 carbon atoms (particularly monocarboxylic acids such as acetic acid, propionic acid, butyric acid and stearic acid) are preferable. Dimethylaminoethyl (meth)acrylate and diethylaminoethyl (meth)acrylate and salts thereof are preferable.

Specific examples of the monomer having a cation-donating group are as follows.

$CH_2$=CHCOO—$CH_2CH_2$—$N(CH_3)_2$ and salt thereof (such as acetate salt)

$CH_2$=CHCOO—$CH_2CH_2$—$N(CH_2CH_3)_2$ and salt thereof (such as acetate salt)

$CH_2$=C($CH_3$)COO—$CH_2CH_2$—$N(CH_3)_2$ and salt thereof (such as acetate salt)

$CH_2$=C($CH_3$)COO—$CH_2CH_2$—$N(CH_2CH_3)_2$ and salt thereof (such as acetate salt)

$CH_2$=CHC(O)N(H)—$CH_2CH_2CH_2$—$N(CH_3)_2$ and salt thereof (such as acetate salt)

$CH_2$=CHCOO—$CH_2CH_2$—N(—$CH_3$)(—$CH_2$—$C_6H_5$) and salt thereof (such as acetate salt)

$CH_2$=C($CH_3$)COO—$CH_2CH_2$—N(—$CH_2CH_3$)(—$CH_2$—$C_6H_5$) and salt thereof (such as acetate salt)

$CH_2$=CHCOO—$CH_2CH_2$—$N^+(CH_3)_3Cl^-$ $CH_2$=CHCOO—$CH_2CH_2$—$N^+$(—$CH_3$)$_2$(—$CH_2$—$C_6H_5$)$Cl^-$ $CH_2$=C($CH_3$)COO—$CH_2CH_2$—$N^+(CH_3)_3Cl^-$ $CH_2$=CHCOO—$CH_2CH(OH)CH_2$—$N^+(CH_3)_3Cl^-$ $CH_2$=C($CH_3$)COO—$CH_2CH(OH)CH_2$—$N^+CH_3)_3Cl^-$ $CH_2$=C($CH_3$)COO—$CH_2CH(OH)CH_2$—$N^+$(—$CH_2CH_3$)$_2$(—$CH_2$—$C_6F_{15}$)$Cl^-$ $CH_2$=C($CH_3$)COO—$CH_2CH_2$—$N^+NCH_3)_3Br^-$ $CH_2$=C($CH_3$)COO—$CH_2CH_2$—$N^+(CH_3)_3I^-$ $CH_2$=C($CH_3$)COO—$CH_2CH_2$—$N^+(CH_3)_3O^-SO_3CH_3$ $CH_2$=C($CH_3$)COO—$CH_2CH_2$—$N^+CH_3$)(—$CH_2$—$C_6H_5$)$_2Br^-$

The ion-donating group-containing monomer is preferably methacrylic acid, acrylic acid and dimethylaminoethyl methacrylate, more preferably methacrylic acid and dimethylaminoethyl methacrylate.

(d) Another Monomer

Another monomer (d) is a monomer other than the monomers (a), (b) and (c). Examples of the other monomer (d) include ethylene, vinyl acetate, vinyl chloride, vinyl halide, styrene, α-methylstyrene, p-methylstyrene, (meth)acrylamide, diacetone (meth)acrylamide, methylolated (meth) acrylamide, N-methylol (meth)acrylamide, alkyl vinyl ether, alkyl halide vinyl ether, alkyl vinyl ketone, butadiene, isoprene, chloroprene, glycidyl (meth)acrylate, aziridinyl (meth)acrylate, benzyl (meth)acrylate, isocyanatoethyl (meth) acrylate, cyclohexyl (meth)acrylate, isobornyl (meth)acrylate, short-chain alkyl (meth)acrylate, maleic anhydride, (meth)acrylate having polydimethylsiloxane group, and N-vinylcarbazole.

Examples of a combination of monomers constituting the fluorine-free polymer are as follows.

Monomer (a)+monomer (b)

Monomer (a)+monomer (b)+monomer (c)

Monomer (a)+monomer (b)+monomer (c)+monomer (d)

A polymer having a combination of monomer (a)+monomer (b)+monomer (c) is preferred, since high water-repellency and high antifouling property are obtained.

The amount of the repeating unit formed from the monomer (a) is 30 to 95% by weight, preferably 40 to 88 wt % by weight, more preferably 50 to 85% by weight, based on the fluorine-free polymer. Alternatively, the amount of the repeating unit formed from the monomer (a) may be at least 20% by weight, at least 30% by weight, at least 40% by weight, at least 50% by weight, at least 60% by weight, or at least 70% by weight, and may be 97% by weight or less, 95% by weight or less, 90% by weight or less, 85% by weight or less, 80% by weight or less, 70% by weight or less, or 60% by weight or less, based on the total of the monomer (a) and the monomer (b).

The amount of the repeating unit formed from the monomer (b) may be 5 to 70% by weight, preferably 6 to 50% by weight, more preferably 8 to 15% by weight, based on the fluorine-free polymer. Alternatively, the amount of repeating unit formed from monomer (b) may be at least 3% by weight, at least 5% by weight, at least 10% by weight, or at least 20% by weight, and may be 70% by weight or less, 60% by weight or less, 50% by weight or less, 40% by weight or less, 30% by weight or less, 20% by weight or less, or 15% by weight or less, based on the total of the monomer (a) and the monomer (b).

The amount of the repeating unit formed from the monomer (c) may be 0.1 to 60 wt %, preferably 0.5 to 30 wt %, more preferably be 1 to 15% by weight, based on the fluorine-free polymer.

A weight ratio of the repeating unit formed from monomer (b) to the repeating unit formed from monomer (c) may be 3:1 to 0.5:1, for example 2.5:1 to 1:1, especially 2.2:1 to 1.5:1.

The amount of the repeating unit formed from the monomer (d) may be 0 to 20% by weight, for example 1 to 15% by weight, particularly 2 to 10% by weight, based on the fluorine-free polymer.

A weight-average molecular weight of the fluorine-free polymer may be 1,000 to 10,000,000, preferably 5,000 to 8,000,000, more preferably 10,000 to 4,000,000. The weight-average molecular weight is a value obtained in terms of polystyrene by a gel permeation chromatography.

As used herein, the term "(meth)acrylic" means acrylic or methacrylic. For example, "(meth) acrylate" means acrylate or methacrylate.

The fluorine-free polymer is generally a random copolymer.

(2) Aqueous Medium

The aqueous medium may be water alone, or a mixture of water and an (water-soluble) organic solvent (such as an alcohol, an ester and a ketone). The amount of the organic solvent may be at most 30% by weight (preferably at least 0.1% by weight), for example, at most 10% by weight, based on the aqueous medium. The aqueous medium is preferably water alone.

The amount of the aqueous medium may be 0.2 to 100 parts by weight, for example 0.5 to 50 parts by weight, particularly 1 to 20 parts by weight, based on 1 part by weight of the water-repellency polymer.

The polymerization of the fluorine-free polymer polymerization is not particularly limited, and may be various polymerization methods such as a mass polymerization, a solution polymerization, an emulsion polymerization, and a radiation polymerization. For example, in general, the solution polymerization using an organic solvent or the emulsion polymerization using water or a mixture of an organic solvent and water is selected. After the polymerization, the resultant polymer liquid may be diluted with water and emulsified in water to prepare a treatment liquid.

Preferably, after the polymerization (for example, the solution polymerization or the emulsion polymerization, preferably the solution polymerization), water is added and then the organic solvent is removed to disperse polymer in water. A self-dispersive product can be manufactured without the need of adding an emulsifier.

Further, for the purpose of adjusting the molecular weight, a chain transfer agent such as a mercapto group-containing compound may be used. Specific examples of the chain transfer agent include 2-mercaptoethanol, thiopropionic acid, and alkyl mercaptan. The chain transfer agent such as the mercapto group-containing compound may be used in the amount of 10 parts by weight or less, for example, 0.01 to 5 parts by weight, based on 100 parts by weight of the monomers.

Specifically, the fluorine-free polymer can be manufactured as follows. In the solution polymerization, a method is adopted in which monomer is dissolved in an organic solvent, nitrogen is replaced, a polymerization initiator is added, and the mixture is heated and stirred, for example, at a temperature of 40 to 120° C. for 1 to 10 hours. Generally, the polymerization initiator may be an oil-soluble polymerization initiator.

The organic solvent is inert to the monomers and dissolves the monomers. Examples of the organic solvent include ketones such as acetone and methyl ethyl ketone; esters such as ethyl acetate and methyl acetate; glycols such as propylene glycol, dipropylene glycol monomethyl ether and N-methyl-2-pyrrolidone (NMP), dipropylene glycol, tripropylene glycol, low molecular weight polyethylene glycol; alcohols such as ethyl alcohol and isopropanol; and hydrocarbon solvents such as n-heptane, n-hexane, n-octane, cyclohexane, methylcyclohexane, cyclopentane, methylcyclopentane, methylpentane, 2-ethylpentane, isoparaffinic hydrocarbons, liquid paraffins, decane, undecane, dodecane, mineral spirits, mineral tarpene and naphtha. Preferable examples of the organic solvent include, for example, acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, Ethyl acetate, butyl acetate, 1,1,2,2-tetrachloroethane, 1,1,1-trichloroethane, trichloroethylene, perchlorethylene, tetrachlorodifluoroethane, trichlorotrifluoroethane, N-methyl-2-pyrrolidone (NMP), and dipropylene glycol monomethyl ether (DPM). The organic solvent is used in the amount of 50 to 2000 parts by weight, for example, 50 to 1000 parts by weight, based on 100 parts by weight of the total of the monomers.

In the emulsion polymerization, there can be used a method of emulsifying monomers in water in the presence of, for example, an emulsifying agent, replacing the atmosphere by nitrogen, adding a polymerization initiator, and polymerizing with stirring, for example, at a temperature within the range from 40° C. to 80° C. for 1 hour to 10 hours. The polymerization initiator may be: a water-soluble polymerization initiator, for example, 2,2'-azobisisobutylamidine dihydrochloride, 2,2'-azobis(2-methyl-propionamide) hydrochloride, 2,2'-azobis[2-(2-imidazolin-2-yl)propane] hydrochloride, 2,2'-azobis[2-(2-imidazolin-2-yl)propane] sulfate hydrate, 2,2'-azobis[2-(5-methyl-2-Imidazolin-2-yl) propane]hydrochloride, potassium persulfate, barium persulfate, ammonium persulfate, and hydrogen peroxide; and an oil-soluble polymerization initiator, for example, 2,2'-azobis(2-methylpropionitrile), 2,2'-azobis(2-methylbutyronitrile), 2,2'-azobis(2,4-dimethylvaleronitrile), 2,2'-azobis(2,4-dimethyl4-methoxyvaleronitrile), 1,1'-azobis(cyclohexane-1-carbonitrile), dimethyl 2,2'-azobis(2-methylpropionate), 2,2'-azobis(2-isobutyronitrile), benzoyl peroxide, di-tertiary-butyl peroxide, lauryl peroxide, cumenehydroperoxide, t-butylperoxypivalate, diisopropylperoxy Dicarbonate and t-butyl perpibalate. The polymerization initiator may be used in the amount of 0.01 to 10 parts by weight, based on 100 parts by weight of the monomers.

In order to obtain a polymer dispersion in water, which is superior in storage stability, it is preferable that the monomers are dispersed in water by using an emulsifying device capable of applying a strong shearing energy (e.g., a high-pressure homogenizer and an ultrasonic homogenizer), and the oil-soluble polymerization initiator is added to conduct the polymerization. As the emulsifying agent, various emulsifying agents such as an anionic emulsifying agent, a cationic emulsifying agent and a nonionic emulsifying agent can be used in the amount within the range from 0.5 to 20 parts by weight based on 100 parts by weight of the monomers. The anionic emulsifying agent and/or the cationic emulsifying agent and/or the nonionic emulsifying agent are preferable. When the monomers are not completely compatibilized, a compatibilizing agent capable of sufficiently compatibilizing them (e.g., a water-soluble organic solvent and a low-molecular weight monomer) is preferably added to these monomers. By the addition of the compatibilizing agent, the emulsifiability and polymerizability can be improved.

Examples of the water-soluble organic solvent include acetone, propylene glycol, dipropylene glycol monomethyl ether (DPM), dipropylene glycol, tripropylene glycol, ethanol, N-methyl-2-pyrrolidone (NMP), 3-methoxy-3-methyl-1-butanol, and isopylene glycol. The water-soluble organic solvent may be used in the range of 1 to 50 parts by weight, for example, 10 to 40 parts by weight, based on 100 parts by weight of water. The addition of NMP or DPM or 3-methoxy-3-methyl-1-butanol or isoprene glycol (preferably in an amount of 1 to 20% by weight, particularly 3 to 10% by weight, based on the composition) improves stability (especially stability of the emulsion). Examples of the low-molecular weight monomer are methyl methacrylate, glycidyl methacrylate, 2,2-trifluoroethyl methacrylate. The low-molecular weight monomer may be used in the amount within the range from 1 to 50 parts by weight, e.g., from 10 to 40 parts by weight, based on 100 parts by weight of total of monomers.

The soil resistant agent may be in the form of a solution, an emulsion (particularly an aqueous dispersion) or an aerosol, but is preferably in the form of an aqueous dispersion. The soil resistant agent comprises the fluorine-free polymer (an active ingredient of the soil resistant agent) and medium (particularly the aqueous medium, such as organic solvent and/or water). The amount of medium may be, for example, 5 to 99.9% by weight, particularly 10 to 80% by weight, based on the soil resistant agent.

The concentration of the fluorine-free polymer may be 0.01 to 95% by weight, for example 5 to 50% by weight, based on the soil resistant agent.

The soil resistant agent can be applied to the object to be treated by a conventionally known method. Usually, the soil resistant agent is diluted with an organic solvent or water, is adhered to surfaces of the substrate by a well-known procedure such as an immersion coating, a spray coating and a foam coating, and is dried.

The concentration of the fluorine-free polymer in the treatment liquid contacted with the substrate may be 0.01 to 10% by weight, for example, 0.05 to 5% by weight, based on the treatment liquid.

The treatment liquid may contain a stain blocking agent, in addition to the fluorine-free copolymer (1).

The stain blocking agent is preferably a phenol/formaldehyde condensate, an acrylic polymer, or a mixture of phenol/formaldehyde condensate and acrylic polymer. Examples of the phenol/formaldehyde condensate include sulfonated phenolic resins. Examples of the acrylic polymer include a methacrylic acid polymer (for example, a methacrylic acid homopolymer, and a methacrylic acid copolymer such as a methacrylic acid/butyl methacrylate copolymer and a styrene-containing methacrylic acid copolymer). The amount of the stain blocking agent may be, for example, 0 to 1000 parts by weight, particularly 1 to 500 parts or 5 to 100 parts by weight, based on 100 parts by weight of the fluorine-free polymer, in terms of solid content.

For example, an Exhaust process may be used, which comprises lowering the pH of the treatment liquid comprising the soil resistant agent, applying the treatment liquid to the textile, heat-treating (or heating) the textile, washing with water, and dehydrating.

In the Exhaust process, the pH of the treatment liquid is set to 7 or less. The pH of the treatment liquid may be, for example, 5 or less, for example 4 or less, especially 3 or less, especially 2 or less. In order to lower the pH, an acid, for example, an aqueous solution of citraconic acid or an aqueous solution of sulfamic acid may be added to the treatment liquid. The textile in the Exhaust process can be heat-treated, for example, by applying steam (for example, 90 to 110° C.) to the textile at a normal pressure for, for example, 10 seconds to 20 minutes.

If desired, a suitable cross-linking agent (such as a blocked isocyanate) may be used for curing.

A blender can be used together if necessary. The blender includes, for example, a water- and oil-repellent agent, a wrinkle-resistant agent, a shrink-proofing agent, a flame retarder, a cross-linking agent, an antistatic agent, a softening agent, a water soluble polymer such as polyethylene glycol and polyvinyl alcohol, a wax emulsion, an antibacterial agent, a pigment, and a coating material. The blender may be added to the treatment liquid at the time of treating the substrate, or may be mixed with the fluorine-free polymer advance if possible.

(3) Acrylic Blender

The blender is preferably an acrylic blender, i.e., a polymer (a homopolymer or a copolymer) having (a repeating unit prepared by) a (meth)acrylic group. The acrylic blender preferably has a repeating unit formed from a monomer wherein a glass transition point or melting point of a homopolymer of the monomer is at least 70° C. (for example, at least 80° C. or at least 100° C.). In a copolymer formed from the monomer wherein the glass transition point or melting point of the homopolymer is 70° C. or more and another monomer wherein the glass transition point or melting point is less than 70° C., the amount of the monomer having the homopolymer glass transition point or melting point of 70° C. or more may be 30% by weight or more, 40% by weight or more, 50% by weight or more, or 80% by weight or more, based on the copolymer. Since an antifouling property is increased, the acrylic blender preferably consists of the monomer having the homopolymer glass transition point or melting point of at 70° C. or more. The glass transition point or melting point of the acrylic blender is preferably at least 70° C., for example, at least 80° C. or at least 100° C., and may be at most 300° C., at most 250° C. or at most 200° C.

Specific examples of the monomer constituting the acrylic blender include amidoethyl stearate acrylate (melting point: 92° C.), methyl methacrylate (glass transition point: 105° C.), acrylic acid (glass transition point: 106° C.) and methacrylic acid (glass transition point: 185° C.). Specific examples of the acrylic blender include a homopolymer of amidoethyl stearate acrylate, methyl methacrylate, acrylic acid or methacrylic acid; or a copolymer of these monomers (for example, amidoethyl stearate acrylate/methyl methacrylate copolymer (e.g., in a weight ratio of 1:9 to 9:1, 2:8 to 8:2, or 3:7 to 7:3)). The acrylic blender can act as the soil resistant agent.

The concentration of the acrylic blender in the treatment liquid in contact with substrate may be 0.01 to 20% by weight, for example, 0.02 to 10% by weight or 0.05 to 5% by weight. The weight ratio of the acrylic blender to the fluorine-free polymer in the treatment liquid may be 1:10 to 1:0.2, for example, 1:5 to 1:0.5, especially 1:1.

The substrate to be treated with the soil resistance agent of the present disclosure include a textile, masonry, a filter (for example, an electrostatic filter), a dust protective mask, a part of fuel cell (for example, a gaseous diffusion electrode and a gaseous diffusion support), glass, paper, wood, leather, fur, asbestos, brick, cement, metal and oxide, ceramics, plastics, a coated surface and a plaster. The textile includes various examples. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semi-synthetic fibers such as rayon and acetate; inorganic fibers such as glass fiber, carbon fiber and asbestos fiber; and a mixture of these fibers.

The textile may be in any form such as a fiber and a fabric.

The fluorine-free polymer can be applied to fibrous substrates (such as textiles) by any known method to treat textiles in liquid. When the textile is a fabric, the fabric may be immersed in the solution or the solution may be adhered or sprayed to the fabric. The treated textiles are dried, preferably heated at a temperature between 100° C. and 200° C. in order to develop the oil repellency.

Alternatively, the fluorine-free polymer can be applied to the textile via a cleaning process, such as in a laundry application or dry cleaning process.

The textile which is treated is typically a fabric, including woven, knitted and nonwoven fabrics, fabrics in garment form and carpet, but may also be a fiber or yarn or intermediate textile such as a sliver or roving. The textile material can be a natural fiber such as cotton or wool, a manmade fiber such as viscose rayon or lyocell or a synthetic fiber such as polyester, polyamide or acrylic fiber, or can be a mixture of fibers such as a mixture of natural and synthetic fibers.

The substrate treated with the soil resistant agent of the present disclosure is preferably a carpet, particularly preferably a carpet made of nylon fibers, polypropylene fibers and/or polyester fibers.

When treating the carpet with soil resistant agent of the present disclosure, the carpet may be formed after treating the fibers or threads with the soil resistant agent, or the formed carpet may be treated with the soil resistant agent.

Alternatively, the fibrous substrate may be leather. The fluorine-free polymer in the form of the aqueous solution or emulsion can be applied to the leather at various stages of leather processing, for example during leather wet end processing or during leather finishing, to render the leather hydrophobic and oleophobic.

Alternatively, the fibrous substrate may be paper. The fluorine-free polymer can be applied to preformed paper or at various stages of papermaking, for example during drying of the paper.

The term "treatment" means that the soil resistant agent is applied to the substrate by, for example, immersion, spray, or coating. The treatment gives the result that a fluorine-free polymer which is an active component of the soil resistant agent is penetrated into internal parts of the substrate and/or adhered to surfaces of the substrate.

EXAMPLES

The following Examples and Comparative Examples are shown to specifically illustrate the present disclosure. However, the present disclosure is not limited to these Examples.

In the following Examples, parts, % and ratio are parts by weight, % by weight and weight ratio, unless otherwise specified.

The procedures of the tests in the following Examples and Comparative Examples are as follows.

Water-Repellency Test

The water-repellency test was conducted according to AATCC Test Method 193). A treated fabric (carpet) was stored in a thermo-hygrostat having a temperature of 21° C. and a humidity of 65% for at least 4 hours. A test liquid (isopropyl alcohol (IPA), water, and a mixture thereof, as shown in Table 1) which has been also stored at 21° C. was used. The test was conducted in an air-conditioned room having a temperature of 21° C. and a humidity of 65%. Five droplets of the test liquid wherein one droplet has an amount of 50 μL were softly dropped by a micropipette on the fabric. If 4 or 5 droplets remained on the fabric after standing for 30 seconds, the test liquid passed the test. The water-repellency is expressed by a point corresponding to a maximum content of isopropyl alcohol (% by volume) in the test liquid which passes the test. The water-repellency was evaluated as twelve levels which are Fail, 0, 1, 2, 3, 4, 5, 6, 7, 8, 9 and 10 in order of a bad level to an excellent level.

TABLE 1

| | Water-repellency test liquid | |
| --- | --- | --- |
| | (% by volume) | |
| Point | Isopropyl alcohol | Water |
| 10 | 100 | 0 |
| 9 | 90 | 10 |
| 8 | 80 | 20 |
| 7 | 70 | 30 |
| 6 | 60 | 40 |
| 5 | 50 | 50 |
| 4 | 40 | 60 |
| 3 | 30 | 70 |
| 2 | 20 | 80 |
| 1 | 10 | 90 |
| 0 | 0 | 100 |
| Fail | Inferior to isopropyl 100 | alcohol 0/ water |

Soil Resistance Test

The soil resistance rest was conducted according to ASTM D6540. The carpet was contaminated with a dry soil having the composition shown in Table 2. In the soil resistance evaluation, ΔE was measured by comparing with the carpet sample before the soil resistance test using a color difference meter. When a value of ΔE is smaller, the soil resistance is better.

TABLE 2

| Ingredients | Wt % |
| --- | --- |
| Pete Moss | 38 |
| Portland Cement | 17 |
| Kaolin | 17 |
| Silica (200 mesh) | 17 |
| Carbon black | 1.75 |
| Iron oxide (III) | 0.5 |
| Mineral oil | 8.75 |

Synthesis Example 1

Into a reactor having a volume of 500 ml equipped with a stirrer, a thermometer, a reflux condenser, a dropping funnel, a nitrogen inlet and a heating device, 100 parts of methyl ethyl ketone (MEK) as a solvent was added. Subsequently, under stirring, a monomer (monomer totally 100 parts) consisting of 85 parts of amidoethyl stearate acrylate (AmEA, melting point: 92° C.), 10 parts of hydroxyethyl acrylate (HEA) and 5 parts of dimethylaminoethyl methacrylate (DM), and 1.2 parts of t-butyl peroxypivalate (PV) as an initiator were added in this order, and the mixture was mixed and stirred for 12 hours in a nitrogen atmosphere at 65-75° C. to conduct the polymerization. The solid concentration of the obtained copolymer-containing solution was 50% by weight.

As a post-treatment, 142 g of 0.4% aqueous acetic acid was added to 50 g of the resulting solution of copolymer to prepare a dispersion, heated by an evaporator to distill off MEK under a reduced pressure to give a milky aqueous dispersion of copolymer (Content of a volatile organic solvent was 1% by weight or less). Ion-exchanged water was added to the aqueous dispersion to obtain an aqueous dispersion having a solid concentration of 15% by weight.

Synthesis Example 2

An aqueous dispersion having a solid concentration of 15% by weight was obtained in the same copolymerization and post-treatment as in Synthesis Example 1, except that 85 parts of stearyl acrylate (StA, melting point: 30° C.) was used instead of AmEA in Synthesis Example 1.

Synthesis Example 3

Into a reactor having a volume of 500 ml equipped with a stirrer, a thermometer, a reflux condenser, a dropping funnel, a nitrogen inlet and a heating device, 100 parts of methyl ethyl ketone (MEK) as a solvent was added. Subsequently, under stirring, a monomer (monomer totally 100 parts) consisting of 85 parts of AmEA, 10 parts of HEA and 5 parts of methacrylic acid (MAA), and 1.2 parts of t-butylperoxypivalate (PV) as an initiator were added in this order, and the mixture was mixed and stirred for 12 hours in a nitrogen atmosphere at 65-75° C. to conduct the polymerization. The solid concentration of the obtained copolymer-containing solution was 50% by weight.

As a post-treatment, 142 g of 0.3% aqueous NaOH was added to 50 g of the solution the resulting copolymer to make a dispersion, heated by an evaporator to distill off MEK under a reduced pressure to give a milky aqueous dispersion of copolymer (Content of a volatile organic solvent was 1% by weight or less). Ion-exchanged water was added to the aqueous dispersion to obtain an aqueous dispersion having a solid concentration of 15% by weight.

Synthesis Example 4

An aqueous dispersion having a solid concentration of 15% by weight was obtained in the same copolymerization and post-treatment as in Synthesis Example 3, except that 85 parts of StA was used instead of AmEA in Synthesis Example 3.

Synthesis Example 5

20 g of AmEA, 20 g of Methyl Methacrylate (MMA, melting point: 105° C.), 10 g of tripropylene glycol, 160 of ion exchanged water, 0.4 g of dioctadecyl ammonium chloride, 0.6 g of sorbitan monooleate, 1.4 g of polyoxyethylene tridecyl ether and 1.6 g of polyoxyethylene lauryl ether were mixed to prepare a mixed solution. The mixed solution was heated to 80° C. and then emulsified by a high-pressure homogenizer. The obtained emulsion was charged with 0.5 g of 2,2-azobis (2-amidinopropane) dihydrochloride after nitrogen substitution. Under stirring, a polymerization reaction was conducted at 60° C. for 3 hours to obtain a copolymer emulsion. Ion-exchanged water was added to the aqueous dispersion to obtain an aqueous dispersion having a solid concentration of 15% by weight.

Synthesis Example 6

An aqueous dispersion having a solid concentration of 15% by weight was obtained in the same copolymerization and post-treatment as in Synthesis Example 5, except that 100 parts of MMA was used instead of AmEA in Synthesis Example 5.

Synthesis Example 7

An aqueous dispersion having a solid concentration of 15% by weight was obtained in the same copolymerization and post-treatment as in Synthesis Example 1, except that 85 parts of t-butyl methacrylate (tBMA, melting point: −60° C.) was used instead of AmEA in Synthesis Example 1.

Synthesis Example 8

An aqueous dispersion having a solid concentration of 15% by weight was obtained in the same copolymerization and post-treatment as in Synthesis Example 3, except that 85 parts of MMA was used instead of AmEA in Synthesis Example 3.

Synthesis Example 9

An aqueous dispersion having a solid concentration of 15% by weight was obtained in the same copolymerization and post-treatment as in Synthesis Example 2, except that 10 parts of N-vinylpyrrolidone (NVP) was used instead of HEA in Synthesis Example 2.

Synthesis Example 10

An aqueous dispersion having a solid concentration of 15% by weight was obtained in the same copolymerization and post-treatment as in Synthesis Example 6, except that 100 parts of StA was used instead of MMA in Synthesis Example 6.

Example 1

To 2 g of the aqueous dispersion prepared by the method of Synthesis Example 1, 98 g of tap water was added to prepare a treatment liquid. The treatment liquid was sprayed so that WPU was 30% (Wet pick up, WPU is 30% when 30 g of liquid is on 100 g of carpet) on carpet (20 cm×20 cm, polyester (PET), cut pile (density 32 oz/yd$^2$)), and the carpet was heat-treated at 120° C. for 5 minutes. Next, a water-repellency test and a soil resistance test were conducted. The results are shown in Table 4.

Example 2

The treatment and the tests were conducted in the same manner as in Example 1 except that the aqueous dispersion of Synthesis Example 2 was used instead of the aqueous dispersion of Synthesis Example 1. The results are shown in Table 4.

Example 3

98 g of tap water was added to 1 g of the aqueous dispersion prepared by the method of Synthesis Example 1 and 1 g of the aqueous dispersion prepared by the method of Synthesis Example 5 to prepare a treatment liquid. The treatment and the tests were conducted in the same manner as in Example 1. The results are shown in Table 4.

Example 4

The treatment and the tests were conducted in the same manner as in Example 3, except that the aqueous dispersion of Synthesis Example 6 was used instead of the aqueous dispersion of Synthesis Example 5 in Example 3. The results are shown in Table 4.

Comparative Example 1

The treatment and the tests were conducted in the same manner as in Example 1, except that the aqueous dispersion of Synthesis Example 7 was used instead of the aqueous dispersion of Synthesis Example 1 in Example 1. The results are shown in Table 4.

Comparative Example 2

The treatment and the tests were conducted in the same manner as in Example 1, except that the aqueous dispersion of Synthesis Example 10 was used instead of the aqueous dispersion of Synthesis Example 5 in Example 3. The results are shown in Table 4.

Comparative Example 3

The treatment and the tests were conducted in the same manner as in Example 1, except that the aqueous dispersion of Synthesis Example 9 was used instead of the aqueous dispersion of Synthesis Example 1 in Example 1. The results are shown in Table 4.

Example 5

99.5 g of tap water was added to 0.5 g of the aqueous dispersion prepared by the method of Synthesis Example 3 to prepare a 0.5% treatment liquid and then a 10 wt % aqueous solution of sulfamic acid was added so that the pH was near 2 to obtain a treatment liquid. The carpet (15 cm×5 cm, polyester (PET), cut pile (density 24 oz/yd$^2$)) washed with tap water and dehydrated to 100% WPU was immersed in the above-mentioned treatment liquid for 30 seconds so as to have 150% WPU. Next, the carpet was applied to an atmospheric pressure steam treatment (temperature 100 to 107° C.) for 60 seconds with the pile surface of the carpet facing up, washed lightly with 2 L of water, dehydrated until WPU was 100%, and heat-treated for 10 at 120° C. A water-repellency test and a soil resistance test were conducted. The results are shown in Table 5.

Example 6

The treatment and the tests were conducted in the same manner as in Example 5, except that the aqueous dispersion of Synthesis Example 4 was used instead of the aqueous dispersion of Synthesis Example 3 in Example 5. The results are shown in Table 5.

Example 7

The treatment and the tests were conducted in the same manner as in Example 5, except that the aqueous dispersion of Synthesis Example 2 was used instead of the aqueous dispersion of Synthesis Example 3 in Example 5. The results are shown in Table 5.

Comparative Example 4

The treatment and the tests were conducted in the same manner as in Example 5, except that the aqueous dispersion of Synthesis Example 5 was used instead of the aqueous dispersion of Synthesis Example 3 in Example 5. The results are shown in Table 5.

Example 8

A treatment liquid was prepared by adding 98 g of tap water to 1 g of the aqueous dispersion prepared by the method of Synthesis Example 3 and 1 g of a stain blocking agent. Further, a 10 wt % sulfamic acid aqueous solution was added so that the pH was near 2, to obtain a treatment liquid. A carpet (15 cm×5 cm, nylon 6 (Ny), cut pile (density 32 oz/yd2)) washed with tap water and dehydrated to 100% WPU was immersed in the treatment liquid for 30 seconds so that the WPU was 150%. Next, the carpet was applied to an atmospheric pressure steam treatment (temperature 100 to 107° C.) for 60 seconds with the pile surface of the carpet facing up, washed lightly with 2 L of water, dehydrated until WPU was 100%, and heat-treated for 10 at 110° C. A water-repellency test and a soil resistance test were conducted. The results are shown in Table 6.

Example 9

The treatment and the tests were conducted in the same manner as in Example 7, except that the aqueous dispersion of Synthesis Example 4 was used instead of the aqueous dispersion of Synthesis Example 3 in Example 7. The results are shown in Table 6.

Comparative Example 5

The treatment and the tests were conducted in the same manner as in Example 7, except that the aqueous dispersion of Synthesis Example 8 was used instead of the aqueous dispersion of Synthesis Example 1 in Example 7. The results are shown in Table 6.

TABLE 3

| | Copolymer Synthesis Examples | | | | | | | |
|---|---|---|---|---|---|---|---|---|
| | AmEA | StA | tBMA | MMA | HEA | NVP | MAA | DM |
| Syn. Ex. 1 | 85 | | | | 10 | | | 5 |
| Syn. Ex. 2 | | 85 | | | 10 | | | 5 |
| Syn. Ex. 3 | 85 | | | | 10 | | 5 | |
| Syn. Ex. 4 | | 85 | | | 10 | | 5 | |
| Syn. Ex. 5 | 50 | | | 50 | | | | |
| Syn. Ex. 6 | | | | 100 | | | | |
| Syn. Ex. 7 | | | 85 | | 10 | | | 5 |
| Syn. Ex. 8 | | | | 85 | 10 | | 5 | |
| Syn. Ex. 9 | | 85 | | | | 10 | | 5 |
| Syn. Ex. 10 | | 100 | | | | | | |

TABLE 4

| | Soil resistant agent | Mix ratio | Copolymer | Carpet | Process method | Water repellency | Soil resistance |
|---|---|---|---|---|---|---|---|
| Ex. 1 | AmEA/HEA/DM | — | Syn. Ex. 1 | PET | Spray | 15% | 12.1 |
| Ex. 2 | StA/HEA/DM | — | Syn. Ex. 2 | PET | Spray | 10% | 13.0 |
| Ex. 3 | AmEA/HEA/DM AmEA/MMA | 50/50 | Syn. Ex. 1 Syn. Ex. 5 | PET | Spray | 10% | 11.0 |
| Ex. 4 | AmEA/HEA/DM MMA | 50/50 | Syn. Ex. 1 Syn. Ex. 6 | PET | Spray | 5% | 11.3 |
| Com. Ex. 1 | tBMA/HEA/DM | — | Syn. Ex. 7 | PET | Spray | Fail | 19.1 |
| Com. Ex. 2 | AmEA/HEA/DM StA | 50/50 | Syn. Ex. 1 Syn. Ex. 10 | PET | Spray | 2% | 18.5 |
| Com. Ex. 3 | StA/HEA/NVP | — | Syn. Ex. 9 | PET | Spray | Fail | 20.5 |

TABLE 5

| | Soil resistant agent | Co-polymer | Carpet | Process method | Water repellency | Soil resistance |
|---|---|---|---|---|---|---|
| Ex. 5 | AmEA/HEA/MAA | Syn. Ex. 3 | PET | Exhaust | 15% | 6.8 |
| Ex. 6 | StA/HEA/MAA | Syn. Ex. 4 | PET | Exhaust | 20% | 7.5 |

TABLE 5-continued

| | Soil resistant agent | Co-polymer | Carpet | Process method | Water repellency | Soil resistance |
|---|---|---|---|---|---|---|
| Ex. 7 | StA/HEA/DM | Syn. Ex. 2 | PET | Exhaust | 10% | 7.9 |
| Com. Ex. 4 | StA/MMA | Syn. Ex. 5 | PET | Exhaust | Fail | 12.6 |

TABLE 6

| | Soil resistant agent | Co-polymer | carpet | Process method | Water repellency | Soil resistance |
|---|---|---|---|---|---|---|
| Ex. 8 | AmEA/HEA/MAA | Syn. Ex. 3 | Ny | Exhaust | 15% | 17.9 |
| Ex. 9 | StA/HEA/MAA | Syn. Ex. 4 | Ny | Exhaust | 20% | 20.3 |
| Com. Ex. 5 | MMA/HEA/MAA | Syn. Ex. 8 | Ny | Exhaust | Fail | 28.4 |

In the Examples (and Synthesis Examples) including the Tables, the meanings of the abbreviations are as follows.

AmEA: Amidoethyl stearate (meth)acrylate
StA: Stearyl acrylate
tBMA: tert.-Butyl methacrylate
MMA: Methyl methacrylate
HEA: Hydroxyethyl acrylate
NVP: N-Vinylpyrrolidone
MAA: Methacrylic acid
DM: Dimethylaminoethyl methacrylate

The invention claimed is:

1. A method of treating a substrate, comprising applying a soil resistant agent to the substrate,
    wherein the soil resistant agent comprises:
    (1) a fluorine-free copolymer comprising:
        (a) a repeating unit formed from an acrylic monomer having a hydrocarbon group containing 7 to 40 carbon atoms, and
        (b) a repeating unit formed from acrylic monomer having a hydrophilic group, and
    (2) water or a mixture of water and an organic solvent dispersing the fluorine-free copolymer (1), and
    wherein the substrate is a textile formed from cotton, wool or a synthetic fiber.

2. The method according to claim 1, wherein the hydrocarbon group-containing acrylic monomer (a) is a monomer represented by the formula:

$$CH_2=C(-X^1)-C(=O)-Y^1(R^1)_k$$

wherein $R^1$ each is independently a hydrocarbon group having 7 to 40 carbon atoms,
    $X^1$ is a hydrogen atom, a monovalent organic group or a halogen atom excluding a fluorine atom,
    $Y^1$ is a group consisting of at least one selected from —O—, —C(=O)—, —S(=O)$_2$— and —NH—, $Y^1$ may further include at least one selected from a divalent to tetravalent hydrocarbon group having 1 carbon atom and —C$_6$H$_4$—, and
    k is an integer of 1 to 3.

3. The method according to claim 1, wherein the hydrocarbon group-containing acrylic monomer (a) is:
    (a1) an acrylic monomer represented by the formula:

$$CH_2=C(-X^4)-C(=O)-Y^2-R^2$$

wherein $R^2$ is a hydrocarbon group having 7 to 40 carbon atoms,
    $X^4$ is a hydrogen atom, a monovalent organic group or a halogen atom excluding a fluorine atom, and
    $Y^2$ is —O— or —NH—, and/or
    (a2) an acrylic monomer represented by the formula:

$$CH_2=C(-X^5)-C(=O)-Y^3-Z(-Y^4-R^3)_n$$

wherein $R^3$ each is independently a hydrocarbon group having 7 to 40 carbon atoms,
    $X^5$ is a hydrogen atom, a monovalent organic group or a halogen atom excluding a fluorine atom,
    $Y^3$ is —O— or —NH—,
    $Y^4$ each is independently a direct bond, or a group consisting of at least one selected from, —O—, —C(=O)—, —S(=O)$_2$— and —NH—, and
    Z is a direct bond, or a divalent or trivalent group having 1 to 5 carbon atoms, and
    n is 1 or 2.

4. The method according to claim 1, wherein, in the hydrocarbon group-containing acrylic monomer (a), the hydrocarbon group has 18 to 40 carbon atoms.

5. The method according to claim 1, wherein the hydrophilic group-containing acrylic monomer (b) is represented by the formulas:

$$CH_2=CX^2C(=O)-O-(RO)_n-X^3 \quad (b1)$$

and/or $$CH_2=CX^2C(=O)-O-(RO)_n-C(=O)CX^2=CH_2 \quad (b2)$$

wherein $X^2$ is a hydrogen atom or a methyl group,
    $X^3$ is a hydrogen atom or an unsaturated or saturated hydrocarbon group having 1 to 22 carbon atoms,
    R each is independently an alkylene group having 2 to 6 carbon atoms, and
    n is an integer of 1 to 90.

6. The method according to claim 1, wherein the fluorine-free copolymer (1) further comprises (c) a repeating unit formed from a monomer having an ion-donating group, other than the monomers (a) and (b).

7. The method according to claim 1, wherein the monomer (c) is a monomer wherein a homopolymer thereof has a glass transition point or melting point of at least 70° C.

8. The method according to claim 6, wherein the amount of the repeating unit formed from the hydrocarbon group-containing acrylic monomer (a) is 30 to 97% by weight, based on the copolymer,
    the amount of the repeating unit formed from the hydrophilic group-containing acrylic monomer (b) is 3 to 70% by weight, based on the total of the acrylic monomers (a) and (b), and
    the amount of monomer (c) is 0.1 to 60% by weight, based on the copolymer.

9. The method according to claim 1, wherein the fluorine-free copolymer (1) is a random copolymer.

10. The method according to claim 1, wherein the soil resistant agent further comprises:
    (3) an acrylic blender having a repeating unit formed from a monomer in which a homopolymer of the monomer has a glass transition point or melting point of at least 70° C.

11. The method according to claim 10, wherein the acrylic blender is a homopolymer or copolymer of at least one monomer selected from the group consisting of amidoethyl stearate acrylate (melting point: 92° C.), methyl methacrylate (glass transition point: 105° C.), acrylic acid (glass transition point: 106° C.) and methacrylic acid (glass transition point: 185° C.).

12. The method according to claim 10, wherein, in the polymer of the acrylic blender, the amount of the monomer, in which a homopolymer of the monomer has a glass transition point or melting point of at least 70° C., is at least 30 wt %, based on the polymer.

13. The method according to claim 1, wherein the substrate which is a textile formed from cotton, wool or a synthetic fiber is a carpet.

14. The method according to claim 13, which comprises imparting water-repellency and soiling resistance to the carpet formed from cotton, wool or a synthetic fiber.

* * * * *